(12) United States Patent
Sabin

(10) Patent No.: US 11,481,426 B2
(45) Date of Patent: *Oct. 25, 2022

(54) PREDICTING ACOUSTIC FEATURES FOR GEOGRAPHIC LOCATIONS

(71) Applicant: Bose Corporation, Framingham, MA (US)

(72) Inventor: Andrew Todd Sabin, Chicago, IL (US)

(73) Assignee: Bose Corporation, Framingham, MA (US)

(*) Notice: Subject to any disclaimer, the term of this patent is extended or adjusted under 35 U.S.C. 154(b) by 867 days.

This patent is subject to a terminal disclaimer.

(21) Appl. No.: 16/298,400

(22) Filed: Mar. 11, 2019

(65) Prior Publication Data
US 2019/0205330 A1 Jul. 4, 2019

Related U.S. Application Data

(63) Continuation of application No. 14/841,166, filed on Aug. 31, 2015, now Pat. No. 10,255,285.

(51) Int. Cl.
*G06N 7/00* (2006.01)
*G06F 16/44* (2019.01)
(Continued)

(52) U.S. Cl.
CPC ......... *G06F 16/444* (2019.01); *G06F 16/683* (2019.01); *G06N 7/005* (2013.01);
(Continued)

(58) Field of Classification Search
CPC ............. G06N 7/005; G06F 17/30743; G06F 17/30061; G06F 16/444; G06F 16/683; G06Q 30/0205; G10L 25/21; G10L 25/72
(Continued)

(56) References Cited

U.S. PATENT DOCUMENTS 10,255,285 B2 4/2019 Sabin
2006/0262938 A1* 11/2006 Gauger, Jr. ............. G10L 21/02
381/56
(Continued)

OTHER PUBLICATIONS

Chon Y. et al., "Automatically Characterizing Places with Opportunistic CrowdSensing using Smartphones", UbiComp '12, Sep. 5-Sep. 8, 2012, Pittsburgh, USA. (Previously provided). (Year: 2012).*

(Continued)

*Primary Examiner* — Dave Misir
(74) *Attorney, Agent, or Firm* — Fish & Richardson P.C.

(57) ABSTRACT

The technology described in this document can be embodied in a computer-implemented method that includes receiving identification information associated with a geographic location. The identification information includes one or more features that affect an acoustic environment of the geographic location at a particular time. The method also includes determining one or more parameters representing at least a subset of the one or more features, and estimating at least one acoustic parameter that represents the acoustic environment of the geographic location at the particular time. The at least one parameter can be estimated using a mapping function that generates the estimate of the at least one acoustic parameter as a weighted combination of the one or more parameters. The method further includes presenting, using a user-interface displayed on a computing device, information representing the at least one acoustic parameter estimated for the geographic location for the particular time.

34 Claims, 6 Drawing Sheets

(51) Int. Cl.
    *G10L 25/21*      (2013.01)
    *G10L 25/72*      (2013.01)
    *G06F 16/683*     (2019.01)
    *G06Q 30/02*      (2012.01)

(52) U.S. Cl.
    CPC .......... *G06Q 30/0205* (2013.01); *G10L 25/21* (2013.01); *G10L 25/72* (2013.01)

(58) Field of Classification Search
    USPC .......................................................... 706/12
    See application file for complete search history.

(56) References Cited

U.S. PATENT DOCUMENTS

| | | | |
|---|---|---|---|
| 2012/0052872 A1* | 3/2012 | Do | G01S 5/18 455/456.1 |
| 2014/0018097 A1* | 1/2014 | Goldstein | G16H 50/80 455/456.1 |
| 2014/0180571 A1* | 6/2014 | Kimchi | G01C 21/26 701/409 |
| 2015/0025998 A1* | 1/2015 | Kang | G06Q 30/0631 705/26.7 |
| 2015/0134418 A1* | 5/2015 | Leow | G06F 16/29 705/7.34 |
| 2016/0188902 A1* | 6/2016 | Jin | G06F 21/6245 726/28 |
| 2017/0060880 A1 | 3/2017 | Sabin | |
| 2017/0235825 A1* | 8/2017 | Gordon | G06F 17/30026 707/740 |

OTHER PUBLICATIONS

Wisniewski M. et al., "NoizCrowd: A Crowd-Based Data Gathering and Management System for Noise Level Data", 2013. (In IDS). (Previously provided). (Year: 2013).*

Asgari, "Inferring Social Contexts From Audio Recordings Using Deep Neural Networks", 2014 IEEE International Workshop on Machine Learning for Signal Processing, Sep. 21-24, 2014, Reims, France. (Year: 2014).*

Genaro, "A neural network based model for urban noise prediction", The Journal of the Acoustical Society of America, 2010. (Year: 2010).*

The Food Channel®; "Noise Levels Noted in Restaurant Reviews"; © 2014 Food Channel Media Group, LLC; 1 page.

Hsu; "Nosiy restaurants: Taking the din out of dinner": Los Angeles Times; Jun. 8, 2012; 3 pp.

International Search Report and Written Opinion; PCT/US2016/047339; dated Oct. 13, 2016; 13 pages.

Windley; "The Live Web: Building Event-Based Connections in the Cloud"; Course Technology; Dec. 21, 2011; 61 pages.

Coulouris et al.; "Distributed Systems: Concepts and Design (5th Edition)"; May 7, 2011; Addison-Wesley; 598 pages.

Wisniewski et al.;"NoizCroud: A Crowd-Based Data Gathering and Management System for Noise Level Data"; Aug. 26, 2013; eXascale Infolab, University of Fribourg, Switserland; 15 pages.

Tanenbaum et al; "Distributed Systems: Principals and Paradigms (2nd Edition)"; Oct. 12, 2006; Prentice Hall; 88 pages.

Shroff; "The Intelligent Web: Search, smart algorithms, and big data"; Jan. 28, 2014; Oxford University Press; 6 pages.

English Translation; Jan-Keno Janssen; "Wobist'n du?—Googles Godienst Latitude"; Jan. 17, 2011; pp. 86-88; http://www.heise.de/artikel-archiv/ct/2011/03/086/@00259@/ct.11.03.086-088.pdf; retrieved on Jul. 30, 2015.

English Translation Leonhard Becker; "Die Verstandnisvolle—iOS 6: Siri verbessert, nene Karten, weniger Google"; Sep. 20, 2012; http://www.heise.de/artikel-archiv/ct/2012/20/116/@00250@/ct.12.20.116-119.pdf; retrieved on Aug. 4, 2015.

International Preliminary Report on Patentability in International Appln. No. PCT/US2016/047339, dated Mar. 15, 2018, 9 pages.

* cited by examiner

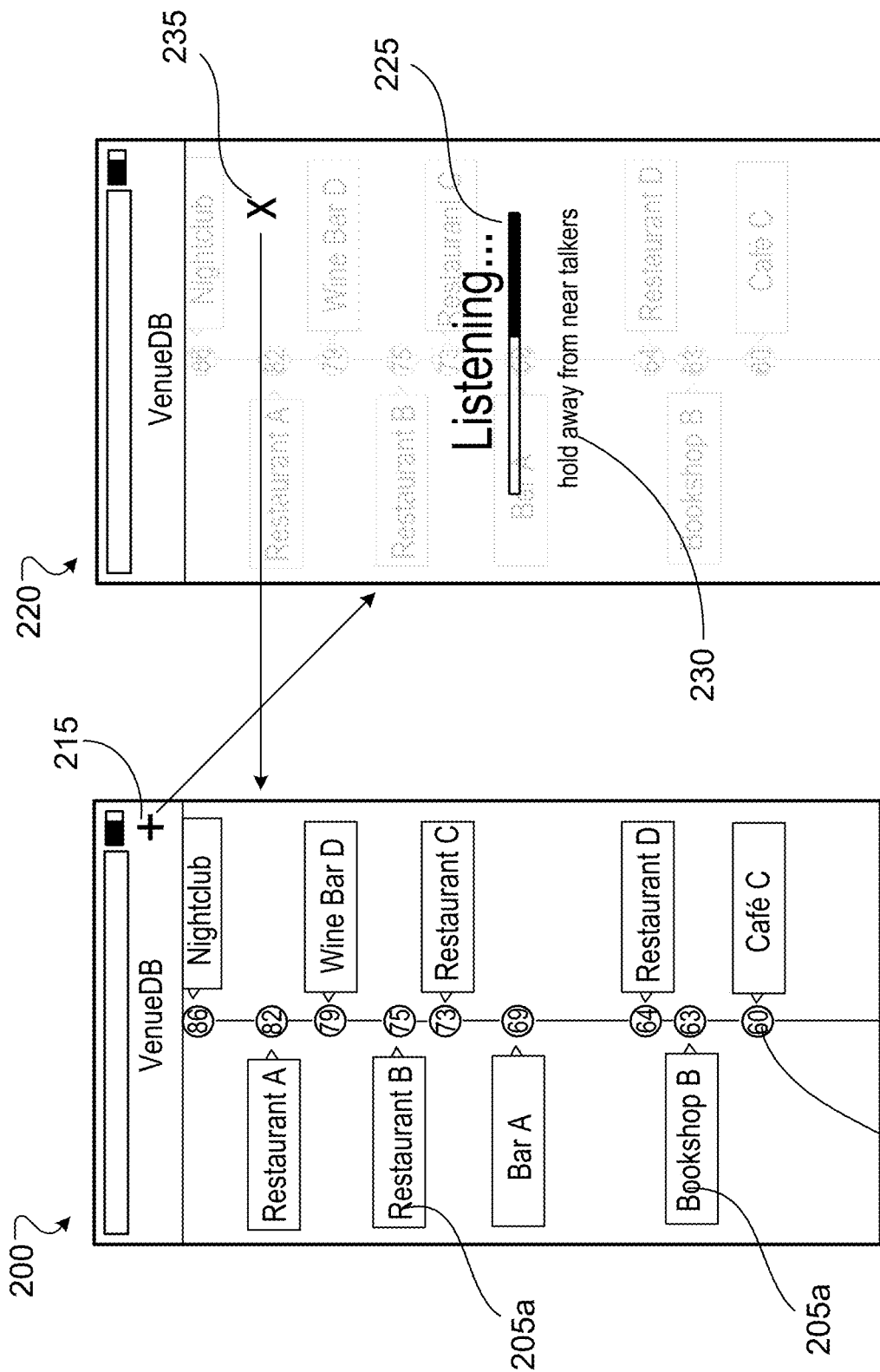

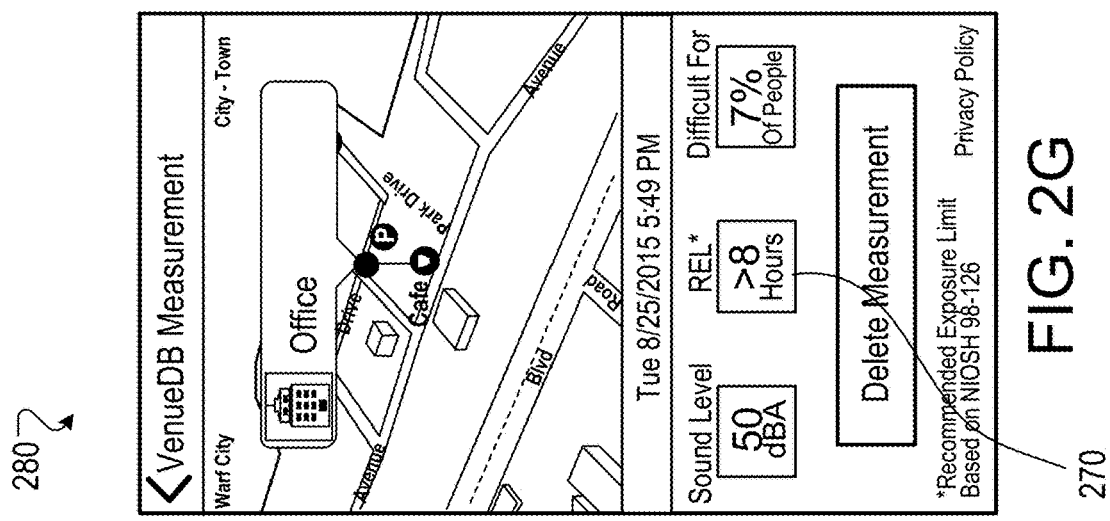
FIG. 2G
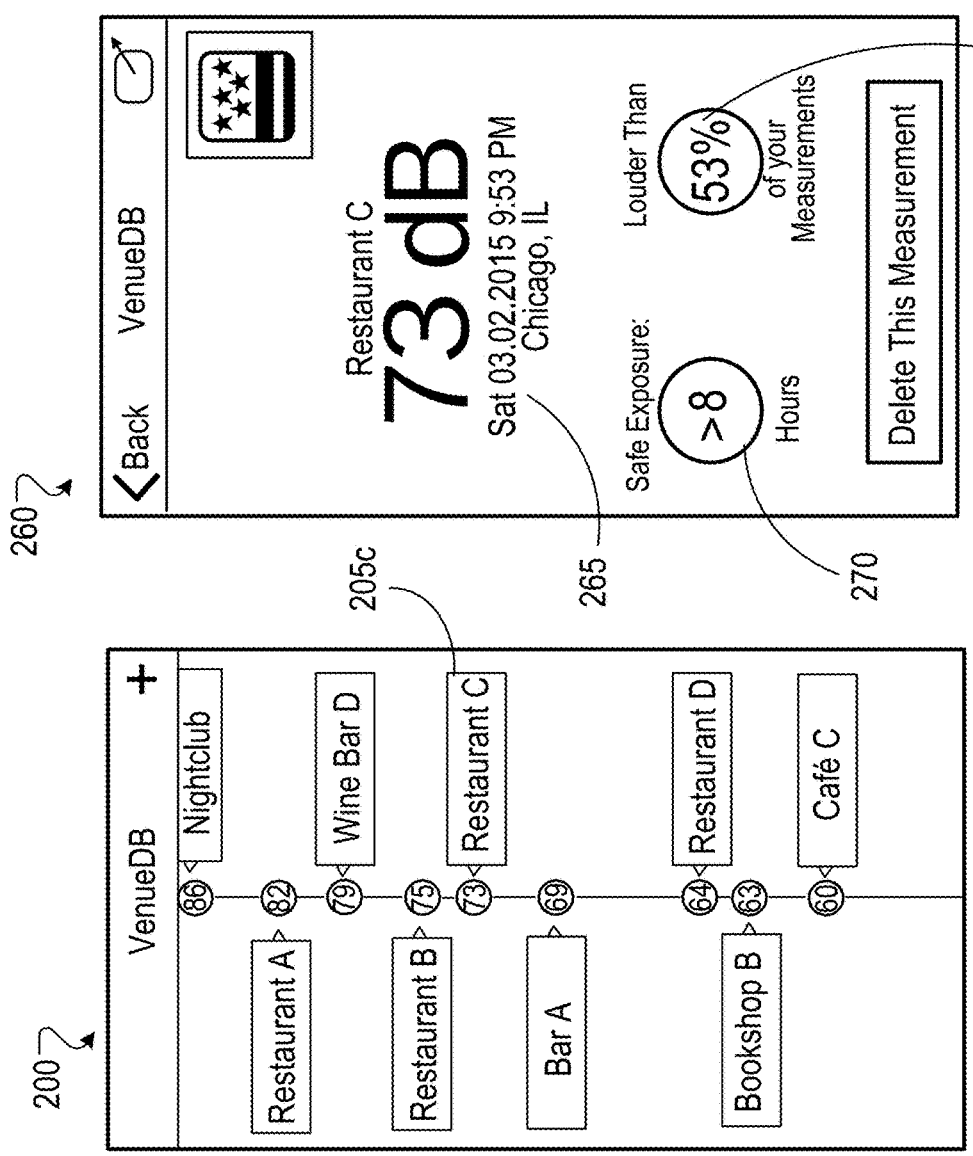
FIG. 2F
FIG. 2E

PREDICTING ACOUSTIC FEATURES FOR GEOGRAPHIC LOCATIONS

CLAIM OF PRIORITY

This application is a continuation of U.S. patent application Ser. No. 14/841,166, filed on Aug. 31, 2015, the entire contents of which are hereby incorporated by reference.

TECHNICAL FIELD

This disclosure generally relates to measurement and prediction of ambient acoustic features at various geographic locations.

BACKGROUND

Ambient acoustics can affect individuals in various ways. For example, various patrons in a restaurant may react differently to the noise level of the restaurant. While some patrons may feel invigorated by an elevated sound level, others may prefer a quieter environment conducive to a conversation.

SUMMARY

In one aspect, this document features a computer-implemented method that includes receiving identification information associated with a geographic location, wherein the identification information includes one or more features that affect an acoustic environment of the geographic location at a particular time. The method also includes determining one or more parameters representing at least a subset of the one or more features, and estimating, based on the one or more parameters, at least one acoustic parameter that represents the acoustic environment of the geographic location at the particular time. The at least one parameter can be estimated using a mapping function that generates the estimate of the at least one acoustic parameter as a weighted combination of the one or more parameters. The method further includes presenting, using a user-interface displayed on a computing device, information representing the at least one acoustic parameter estimated for the geographic location for the particular time.

In another aspect, the document features a system that includes a prediction engine and a storage device. The prediction engine includes one or more processors, and is configured to receive identification information associated with a geographic location. The identification information includes one or more features that affect an acoustic environment of the geographic location at a particular time. The prediction engine is also configured to determine one or more parameters that represent at least a subset of the one or more features, and estimate, based on the one or more parameters, at least one acoustic parameter that represents the acoustic environment of the geographic location at the particular time. The at least one parameter can be estimated using a mapping function that generates the estimate of the at least one acoustic parameter as a weighted combination of the one or more parameters. The prediction engine can be further configured to cause a presentation of information representing the at least one acoustic parameter estimated for the geographic location for the particular time. The information representing the at least one acoustic parameter can be presented on a user interface displayed on a computing device. The storage device can be configured to store a representation of the mapping function.

In another aspect, the document features one or more machine-readable storage devices having encoded thereon computer readable instructions for causing one or more processors to perform various operations. The operations include receiving identification information associated with a geographic location, wherein the identification information includes one or more features that affect an acoustic environment of the geographic location at a particular time. The operations also include determining one or more parameters representing at least a subset of the one or more features, and estimating, based on the one or more parameters, at least one acoustic parameter that represents the acoustic environment of the geographic location at the particular time. The at least one parameter can be estimated using a mapping function that generates the estimate of the at least one acoustic parameter as a weighted combination of the one or more parameters. The operations further include causing a presentation of information representing the at least one acoustic parameter estimated for the geographic location for the particular time, wherein the information representing the at least one acoustic parameter is presented on a user interface displayed on a computing device.

Implementations of each of the above aspects can include one or more of the following features.

The one or more geographic locations can include at least one of: a restaurant, a bar, or a retail establishment. A plurality of weights associated with the weighted combination can be determined using a machine learning process. The machine learning process can include a deep neural network process. Determining the plurality of weights can include accessing training information that includes at least one of: (i) time-specific information and (ii) location-specific information associated with ambient acoustic features at a plurality of geographic locations. The training information can also include a measure of acoustic environment for each of the plurality of geographic locations. The machine learning process can also include identifying, from at least a portion of the training information, a set of input parameters each for at least a subset of the plurality of geographic locations, and determining the plurality of weights. The plurality of weights can be determined based on (i) the sets of input parameters and (ii) the corresponding measures of acoustic environments, such that each set of input parameters, when combined in a weighted combination using the plurality of weights, maps to the corresponding measure of acoustic environment.

The measure of acoustic environment can include a sound pressure level (SPL) at the corresponding geographic location. The information about the SPL can be received from one or more mobile devices or hearing assistance devices. The training information can include crowdsourced information on the ambient acoustic features at the plurality of geographic locations. The training information can be gathered using an application configured to be deployed on mobile devices. The training information can be retrieved from web-based content that includes information on the ambient acoustic features at the plurality of geographic locations. The training information can be retrieved using an application programming interface (API). The training information can be retrieved from one or more social networking websites. The training information can include information on one or more of: a day of the week, a time of the day, or a time of the year. The at least one acoustic parameter can include a sound pressure level (SPL) or a power spectrum. The at least one acoustic parameter can represent one of: a parameter of an auditory model related to speech intelligibility, or a speech transmission index (STI).

The one or more parameters can represent a percentage of a predetermined level of activity at the one or more geographic locations for the particular time. The one or more input parameters can represent information on location and/or physical characteristics of the one or more geographic locations. The at least one acoustic parameter can be overlaid on a map presented on the user-interface. The user-interface can include one or more controls for displaying geographic locations for which the corresponding acoustic parameters are less than a threshold. The user-interface can include controls for displaying an ordered list of the one or more geographic locations, wherein the list is ordered based on the corresponding ambient acoustic parameters. Presenting the information related to the at least one acoustic parameter can include displaying a time period for which the estimation valid. The user-interface can be provided by an application executing on a mobile device. The application can include one or more controls for obtaining a measurement representing an ambient acoustic feature, and associating the measurement with a particular geographic location.

Various implementations described herein may provide one or more of the following advantages.

A prediction of one or more acoustic features, such as noisiness, at a given location for a given time can allow a user to make an informed decision about a venue for an event. The predicted one or more acoustic features of multiple venues can be presented on a unified interface allowing the user to select a venue that satisfies personal preferences associated with such acoustic features. By generating predictions for one or more acoustic features (e.g., noise-level) based on time-specific and location-specific information collected from a variety of sources, prediction accuracy and reliability may be increased. By collecting at least a portion of the time-specific and location-specific information using applications deployed on user devices, the data collection process can be crowd-sourced, thereby possibly increasing its efficiency and speed. This in turn can allow for creating and maintaining a large database of real-world measurements that can be used for prediction.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

FIGS. 2A-2I show examples of user interfaces for obtaining ambient acoustic feature measurements and presenting information on predicted ambient acoustic features.

DETAILED DESCRIPTION

Figure 1:
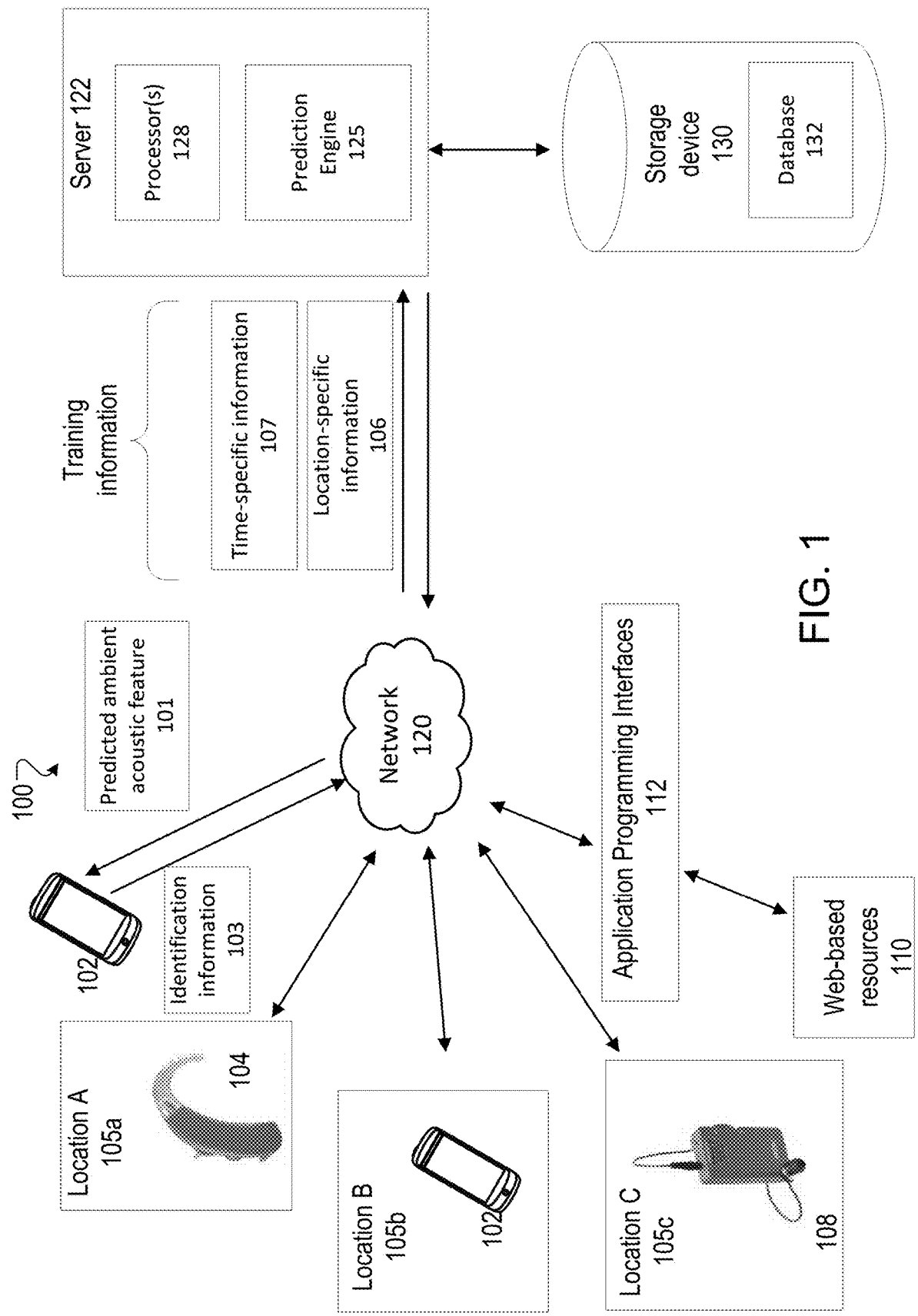
FIG. 1 is a diagram showing an example of an environment for providing predictions of ambient acoustic features.

Ambient acoustic features can be an important factor in deciding a choice of venue for an event. For example, an individual trying to select a restaurant for a dinner can be interested in learning how quiet or loud the restaurant would be during the dinner, and make the selection only if the ambient acoustic feature for the proposed time matches the individual's personal preferences regarding ambient acoustic features. The personal preferences can in turn depend on a variety of factors such as purpose of visit, time of visit, type of companions, or type of location. For example, if an individual is going to a restaurant for a business lunch, he or she may prefer a quiet ambience appropriate for a business conversation. However, when the same individual is looking for a sports bar to visit with friends, he or she may prefer a lively bar where the ambient sound level is higher than a threshold.

In some cases, ambient sound levels can also be indicative of the popularity of a location, such as a restaurant. For example, if the ambient sound level of a restaurant is lower than a threshold during what would be considered as prime time, such information may indicate that the particular restaurant is not popular. Another restaurant where the ambient sound level is higher than a threshold even during off-peak hours may be considered to be a popular choice among patrons. Such elevated sound level can also indicate, for example, that the restaurant plays loud music. In some cases, time specificity of ambient sound level information may also be indicative of how busy a particular venue is. For example, if the ambient sound level of a restaurant during Friday evening is significantly higher than that during other weekday evenings, the information may be indicative of higher occupancy during Friday evenings. This in turn can inform a patron of the restaurant that advanced reservation may be needed for Friday evenings.

The technology described in this document can be used to generate, and present to a user, time-specific predictions of ambient sound levels for various locations, thereby allowing the user to select a venue where the sound level satisfies the user's preferred noise level for the corresponding event. The time-specific predictions can be generated based on a variety of time-specific and/or location-specific (which may also be time-specific) information obtained from various sources. The information used in generating the time-specific predictions can include, for example, ambient sound level information for various locations as collected using user devices at those locations, and/or information retrieved from one or more web-based resources associated with the locations. For example, with appropriate user-permission (e.g., upon receiving user-instructions), sound level information at a particular restaurant can be collected using a smartphone or hearing assistance device (e.g., a hearing aid) of a user visiting the restaurant. Sound level information about the restaurant may also be retrieved or derived based on information available on one or more websites, social networking sites, and/or web-based applications associated with the restaurant. By combining information from a diverse set of resources, the technology described in this document may enhance the reliability and accuracy of predictions on sound levels, which in turn allows a user to make an informed selection of venue for a corresponding event.

FIG. 1 shows an example environment 100 for generating and presenting time-specific predictions of one or more features associated with ambient acoustics (e.g., sound levels) for various locations. The environment 100 includes a computing device (such as the server 122) that includes a prediction engine 125. The prediction engine 125 is configured to generate one or more predicted ambient acoustic features 101 for a given location identified by identification information 103. The identification information 103 can include, for example, GPS information determined by a smartphone. The one or more predicted acoustic features 101 are generated, for example, based on information (e.g., various time-specific information 107 and/or location specific information 106) collected for various locations 105a, 105*b*, 105*c*, etc. (105 in general). The collected information can include information on various acoustic features (e.g., sound level, reverberation, or power spectrum of ambient noise) of the environment at the various locations 105, and/or other non-acoustic features (e.g., location specific features such as restaurant type or GPS coordinates).

The acoustic information collected or predicted within the environment 100 can include, for example, various spectral, temporal, or spectro-temporal statistics, including, for example, overall sound pressure level (SPL), variation in sound pressure level over time, sound pressure level in a number of frequency bands, variation of level in each band over time, the estimated signal-to-noise ratio, the frequency spectrum, the amplitude modulation spectrum, cross-frequency envelope correlations, cross-modulation-frequency envelope correlations, outputs of an auditory model, speech transmission index (STI), and/or mel-frequency cepstral coefficients. The acoustic information can also include information identifying a presence of one or more acoustic sources of interest (e.g., human speakers), or acoustic sources of a predetermined type (e.g., background music).

The acoustic information (e.g., the time-specific information 107 and/or the location specific information 106) may be obtained from various sources. For example, the acoustic information may be collected, with appropriate user-permission, using user devices (e.g., handheld devices, hearing assistance devices, or other devices (e.g., headphones or speakers) that are capable of measuring one or more parameters associated with the acoustic environment of the location 105 they are in. Examples of the hearing assistance devices include hearing aids 104 and personal amplifiers 108. Examples of handheld devices 102 can include, for example, a smartphone, a tablet, an e-reader, or a media playing device. The handheld devices or hearing assistance devices can be configured to communicate, for example, over a network 120, with a remote computing device such as the server 122. The server 122 includes one or more processors or processing devices 128.

The acoustic information may also be obtained from various web-based resources 110 that store, provide, or otherwise make available information on the locations 105. The prediction engine may access the web-based resources 110, for example, via one or more application programming interfaces 112 that allow interactions with corresponding web-based resources 110. The time-specific information 107 and/or the location specific information 106 obtained from the various sources may be stored on a storage device 130 accessible by the prediction engine 125, for example, as a database 132, and used in generating the one or more predicted ambient acoustic features for a given location.

In some implementations, the acoustic information can be directly measured by corresponding user devices. For example, with appropriate user-permission, a user device such as a smartphone 102, a hearing aid 104, or a personal amplifier 108, can be used to measure SPL at corresponding locations. In some implementations, the acoustic information can be derived from one or more other parameters measured by the user devices. For example, SPL information can be derived from a recording of ambient sounds, as obtained using a smart phone 102. In some implementations, the user devices can be configured to measure an estimated reverberation time at the corresponding locations.

In some implementations, the acoustic information can be obtained from various web-based resources 110 that store, provide, or otherwise make available information on the locations 105. This can be done, for example, by accessing the web-based resources 110 via one or more corresponding application programming interfaces (API) 112 that allow interactions with the content provided by the web-based resources 110. For example, information about the sound level of a restaurant can be obtained by automatically parsing, via a corresponding API, reviews about the restaurant available on a website, or by retrieving comments posted about the restaurant on a social network. This can be done, for example, by identifying common keywords or phrases ("loud," "soft music," "difficult to hear," etc.) that appear across the reviews or other available content. In some implementations, the amount of social network activity related to a location during a particular time period can also be used to derive an indication of one or more acoustic features at the location for that particular time period. For example, if the number of photos or comments posted about a restaurant is higher during the evenings than during the afternoon, the restaurant likely has a higher sound level in the evening as compared to that in the afternoon.

The acoustic information obtained (e.g., from user devices and/or web-based resources) for various locations can include time-specific information 107. The time-specific portion of the acoustic information has associated with it, one or more parameters that link the acoustic information to a particular time point or period of time. For example, the time-specific information 107 can include a time stamp, which links the corresponding acoustic information to, for example, a time of the day, a day of the week, or a month. In some implementations, the time-specific information can include identification of particular days or periods (e.g., back-to-school week, spring break, or examination-study period for a local school).

In some implementations, the time-specific information 107 can include information on one or more events that are scheduled for the corresponding time point or time period. For example, the time-specific information 107 can include a schedule of events that are likely to affect one or more acoustic features at the locations. For example, the time-specific information 107 can include the schedule of televised games (e.g., a sports bar is likely to have an elevated sound level during a televised game), schedule of live events near the corresponding locations (e.g., a wine bar near a concert venue is likely to have an elevated sound level before and after a concert, but a relatively lower sound level during the concert), or a schedule of events for a particular location (e.g., a restaurant is likely to have an elevated sound level when a live band is playing).

The acoustic information can include location-specific information 106. The location-specific portion of the acoustic information has associated with it, one or more parameters that link the acoustic information to a particular location or type of location. For example, the location specific information 106 can include one or more identifiers that identify a venue type (e.g., a wine bar, a French restaurant, a barber shop, or a shopping mall) for the corresponding locations. A particular location may be associated with multiple identifiers. Other examples of location specific information 106 can include name of city, city type (e.g., urban, suburban, rural), demographics of patrons (e.g., age, gender etc.), expensiveness ("$$" or "$$$$"), locality, neighboring landmarks (e.g., whether next to a busy road or next to a beach).

In some implementations, the location-specific information 106 can include identification of one or more structural parameters that affect one or more acoustic features of a particular location. For example, a restaurant with high ceilings can have an elevated sound level than one with a low ceiling. In another example, a carpeted restaurant is likely to be quieter than one with marble floors. In some implementations, the location specific information 106 can include dimensions of the particular location, which can be obtained, for example, from a repository that stores dimensions of buildings of the corresponding city or town. In some implementations, the location specific information 106 can include information on surface materials (e.g., carpeted, wooden, or marble floors) at the location. In some implementations, information on the dimensions or materials can be estimated, for example, using an image analysis process on photos of the location as available on a website or social network, or based on information available in maps.

In some implementations, at least a portion of the location specific-information can also be time-specific. For example, the location specific information 106 can include information on the weather at a given location for a particular period of time. Weather information can be used in determining one or more acoustic features of a particular location. For example, if a restaurant opens the patio in warm weather, the sound level of an indoor portion of the restaurant could be lower than the patio. The location-specific information 106 can also include traffic information for an adjoining road for a particular period of time. Typically, busy traffic would indicate an elevated sound level, particularly for outdoor locations. In some implementations, the location specific information can also include information on social media activity associated with the location for a particular time.

The location specific information 106 can be obtained with various degrees of granularity. In some implementations, the location associated with the acoustic information can be determined based on global positioning system (GPS) coordinates associated with the user device collecting the acoustic information. In some implementations, a plurality of candidate locations can be presented via a user interface (e.g., on a smartphone), and a user can be asked to select the most accurate location. In some implementations, a cellular network or a local network (e.g., a Wi-Fi network) can be used in identifying locations with a high degree of resolution. In such cases, the acoustic information can be linked to different parts of a restaurant, for example, to determine if one part of the restaurant (e.g., upstairs or indoors) is louder or quieter as compared to another part (e.g., downstairs or outdoor, respectively) of the restaurant. Resolution of the location can also be improved, for example, based on user-inputs received via the user devices. For example, when selecting the most accurate location from a plurality of choices, a user can be asked to identify a sub-part of the corresponding location. In some implementations, sensors such as camera arrays can be used to generate a three dimensional (3d) model of the venue. As a user moves through a venue, in some implementations, a location within the venue can be determined, for example, using a combination of data collected using a motion sensor (e.g., accelerometer) and a generated/updated 3d model.

The time-specific information 107 and the location-specific information 106 is used in training a machine learning process executed by the prediction engine 125. Once trained, the prediction engine 125 outputs one or more predicted ambient acoustic features 101 for a location identified using identification information 103. In some implementations, the acoustic information can be stored on a storage device 130 (possibly as a part of a database 132) accessible to the prediction engine 125. In some implementations, the acoustic information is stored as a collection of data items, each of which includes an acoustic feature (also referred to as a dependent variable) representing, for example, a sound level, wherein the acoustic feature is linked to representations of one or more time-specific and/or location specific features (also referred to as independent variables) retrieved from the corresponding time-specific information 107 and/or location-specific information 106. The machine learning process can be trained using the stored acoustic information as training data such that the machine learning process determines a relationship between the independent and dependent variables. Once the machine learning process is trained, the determined relationship can be used for determining the one or more predicted ambient acoustic features 101 from a set of independent variables identified by the prediction engine 125 based on the identification information 103. In one illustrative example, if the prediction engine 125 uses linear regression as the machine learning process, the following relationship between the independent and dependent variables may be derived from the acoustic information:

$$y_i = \beta_0 + \beta_1 x_{i1} + \beta_2 x_{i2} + \ldots \beta_p x_{ip}$$

where i indexes the feature sets associated with corresponding locations (each feature set including representation of the acoustic feature, and the corresponding representations of one or more time-specific and/or location-specific parameters), y represents the acoustic feature (dependent variable), $x_1, x_2, \ldots, x_n$ represent each of p time-specific and/or location-specific features (the independent or predictor variables), and $\beta_1, \beta_2, \ldots, \beta_n$ represent the coefficients applied to the corresponding independent variables. Once such a relationship is determined by the prediction engine 125, a predicted ambient acoustic feature 101 can be computed as a function of the independent variables identified from identification information 103 corresponding to a new location.

Various combinations of the time-specific information 107 and location-specific information 106 can be used as the independent variables. For example, a score or value can be assigned to a particular time-specific or location-specific information (e.g., venue type) before using the information in the training process. For example, a sports bar can be assigned a higher score than a wine bar as the former is more likely to have a higher sound level than the latter. Examples of the dependent features can include SPL, power spectrum, or one or more parameters representing speech intelligibility.

In some implementations, a parameter representing a level of social media activity can be used as the dependent variable. In such cases, the prediction engine 125 implements an intermediate step in which a machine learning process estimates the percentage of maximum activity as well as venue-specific coefficients that map from the percentage of maximum activity to acoustic features such as SPL. In some implementations, social media activity can be used as a proxy for number of individuals in a venue. For instance, the number of photographs posted to a photograph-sharing social network varies by the hour of the day and day of the week. The specific hour of the week with the most posted photographs can be considered as the time corresponding to the maximum activity, with the number of photographs posted representing a measure of the maximum activity. All other hours of the week can be represented as percentage of the maximum activity by dividing the number of photographs in that hour, by the number of photographs in the maximum hour.

Estimating the percentage of maximum activity can be done, for example, by training the machine learning process to estimate factors representing social media activity, (e.g., number of check-ins at a location, number of mentions on social media posts, and number of images taken at the particular location). In some implementations, this approach provides the advantage of implementing a machine learning process without using features that represent acoustic information.

In some implementations, a separate machine learning process may be used to determine a mapping function that maps the percentage of maximum activity to one or more acoustic features. For example, a quadratic relationship between the percentage of maximum activity and SPL can be determined as:

$$y=\beta_2 x^2+\beta_1 x+\beta_0$$

where y represents SPL and x represents percentage of maximum activity. The coefficients represented by β would be determined by the prediction engine using a machine learning process.

In some implementations, the collected acoustic information can be preprocessed by the prediction engine 125. For example, the time-specific and/or location-specific features can be subjected to a dimension reduction process (e.g., a principal components analysis (PCA), or independent component analysis (ICA)) to represent the collected information using a smaller number of independent features. Dimension reduction refers to machine learning or statistical techniques in which a number of datasets, each specified in high-dimensional space, is transformed to a space of fewer dimensions. The transformation can be linear or nonlinear, and can include, for example, principal components analysis, factor analysis, multidimensional scaling, artificial neural networks (with fewer output than input nodes), self-organizing maps, and k-means cluster analysis.

Even though FIG. 1 depicts the prediction engine 125 as a part of the server 122, in some implementations, at least a portion of the prediction engine 125 can reside on a user device such as a handheld device 102. Various machine learning processes can be used by the prediction engine 125 in determining the one or more predicted ambient acoustic features. For example, one or more machine learning techniques such as linear regression, deep neural networks, naïve Bayes classifiers, and support vector machines may be used to determine a relationship between the independent variables and the dependent variables.

The technology described herein can also facilitate various types of user interaction with the prediction engine 125. The interactions can be facilitated, for example, by a user interface provided via an application that executes on a handheld device 102. The application can be configured to measure one or more parameters representative of the acoustic environment of the location in which the handheld device is present. The application can also be configured to provide the measured parameters to the prediction engine 125 as at least a portion of the time-specific information 107 or location-specific information 106.

In some implementations, the application is configured to allow a user to provide the identification information 103 to the prediction engine 125, and receive the one or more predicted ambient acoustic features 101 for the location and time identified by the identification information 103. For example, the application can be configured to allow a user to enter queries that represent questions such as "How loud will Restaurant X in Boston be on Thursday at 6 PM?" or "what is the quietest wine bar within 5 miles of my location?" or "what is the nearest venue that is 10 dB quieter than my current location?"

Figures 2C, 2D:
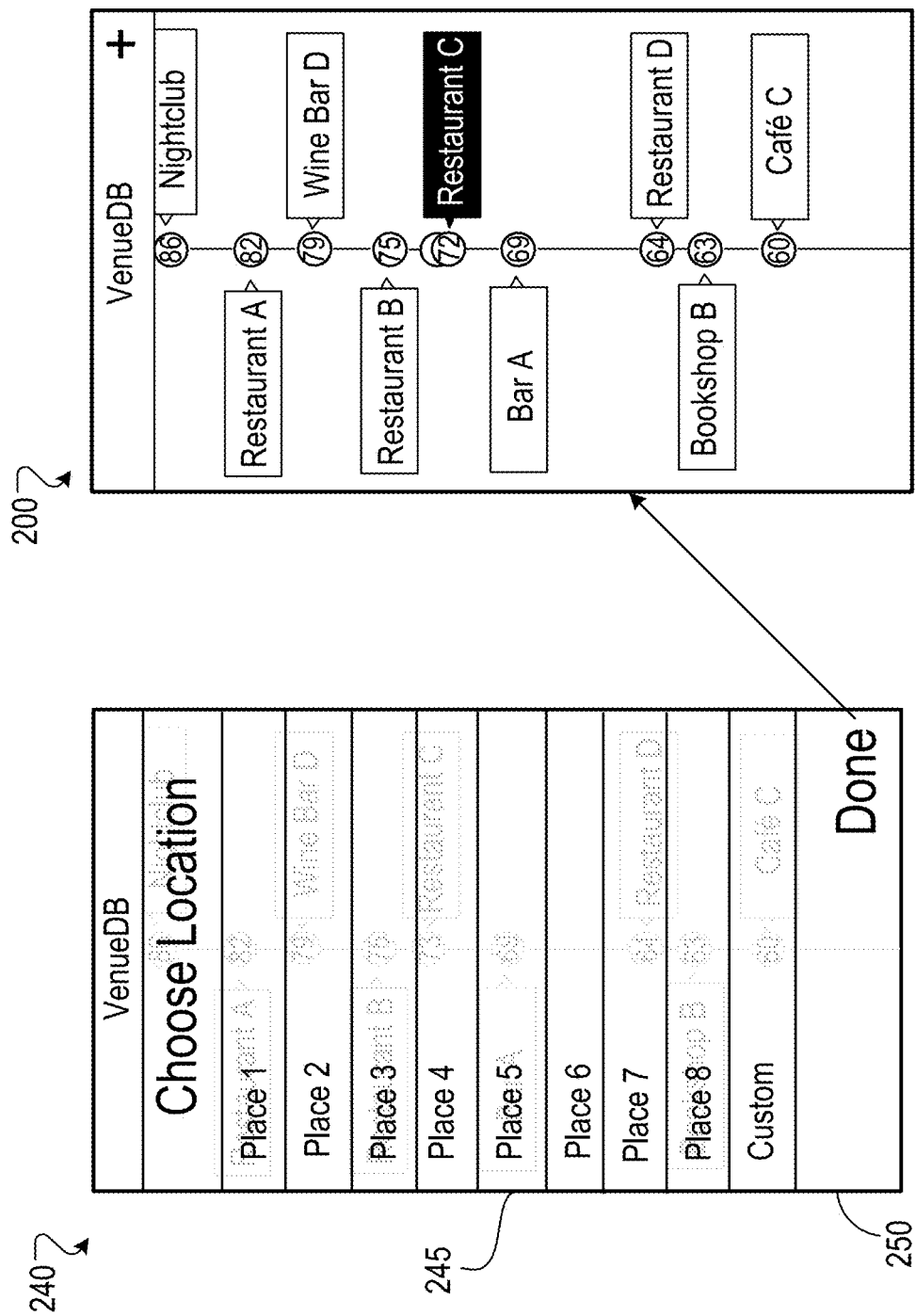

Various functionalities of the application can be implemented via a user interface. Examples of such user interfaces are depicted in FIGS. 2A-2H. FIG. 2A shows an example interface 200 that presents a list of locations 205a, 205b, etc. (205, in general) for which predicted or measured acoustic features (e.g., sound levels 210) are available. The example of FIG. 2A shows the locations 205 sorted in a decreasing order of sound level. However, the interface 200 can include one or more additional controls that allow a user to sort, delete, add, or otherwise edit locations 205 and the corresponding sound levels 210. In some implementations, the interface 200 includes a control 215 for adding a location. Activation of the control 215 (e.g., by touching the control, if displayed on a touchscreen device) can initiate measurement of an acoustic feature by the application. This can include, for example, accessing a microphone or another transducer of the corresponding user device and initiating a measurement of the ambient sound level. This can also cause the interface 220 (as shown in FIG. 2B) to be presented (possibly overlaid on the interface 200) on the display of the user device. The interface 220 can include, for example, a visual representation 225 of the progress of the measurement process, one or more instructions 230 associated with the measurement process, and a control 235 for aborting the measurement process.

FIG. 2C shows an example of an interface 240 that is displayed once the measurement process is completed. In some implementations, the interface 240 includes a list 245 of one or more potential locations as determined, for example, using the GPS of the user device. For example, if the measurement is done at a particular restaurant, and there are several other restaurants (or venues of interest) in the vicinity, the list 245 can include the most likely candidate locations, and allow a user to select the most accurate one. In some implementations, the interface 240 can include a custom option 250 that allows a user to input a personalized identifier for the location. Once the user selects a location from the list 245, the corresponding identifier, and the associated acoustic feature (e.g., sound level) is presented within the interface 200, as shown in FIG. 2D.

The interface 200 depicted in FIG. 2A is reproduced in FIG. 2E for ease of visualization. As shown in FIG. 2E, the representations of the locations 205 (205c in this particular example) can act as controls, which upon activation, presents another interface for displaying additional information associated with the corresponding locations. In this example, activating the control 205c causes the presentation of the example interface 260 depicted in FIG. 2F. The interface 260 can present, for example, a time and location specific representation 265 of one or more acoustic features. The interface 260 can also include additional information associated with the one or more acoustic features. For example, the interface 260 can include exposure information 270 which represents a duration of time for which a person can be exposed to the level of sound displayed for the location. This information can be particularly useful for locations with high sound levels (e.g., night clubs) as it can inform a user of a time limit of safe exposure (e.g., a safe exposure limit as calculated according to industry/government standards such as those used by OSHA and NIOSH, as depicted in FIG. 2G). The interface 260 can also include a percentile representation 275 that indicates how the particular location compares with other locations for which the user has performed measurements or estimations. In some implementations, the locations 205 can be overlaid on a map-based interface 280 depicted in FIG. 2G.

In some implementations, a visual representation of measured or predicted acoustic features for a particular location or venue (or type of venue) can be presented via an interface.

Figure 2H:
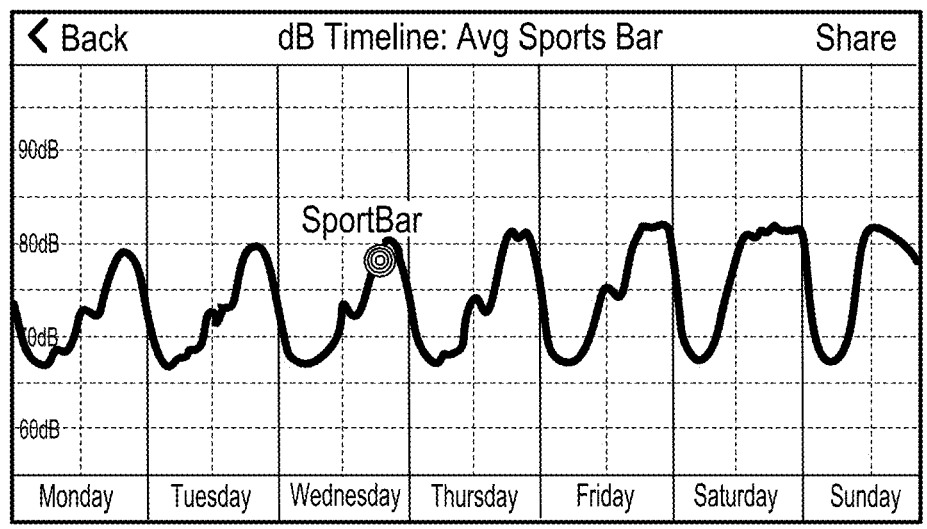
Figure 2I:
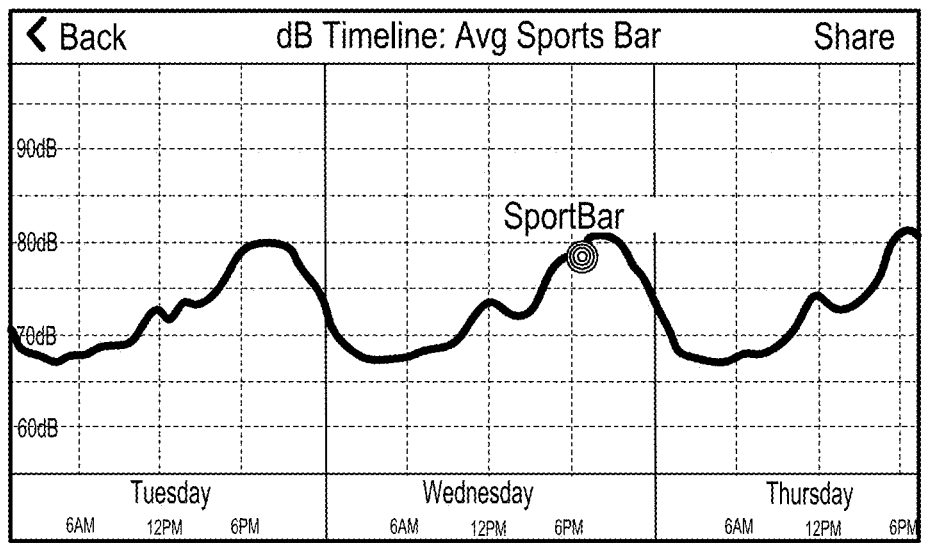

In the example shown in FIG. 2H, the interface 285 presents a time variation of measured and/or predicted sound levels for an average sport bar. The interface 285 can also allow for zooming into a portion of the representation. This is depicted in FIG. 2I, which shows the variation at a higher level of resolution. In some implementations, a particular location can be overlaid on the representation for comparison purposes. For example, FIGS. 2H and 2I depict how a particular sports bar (depicted as SportBar) compares with the average for the given time.

Figure 3:
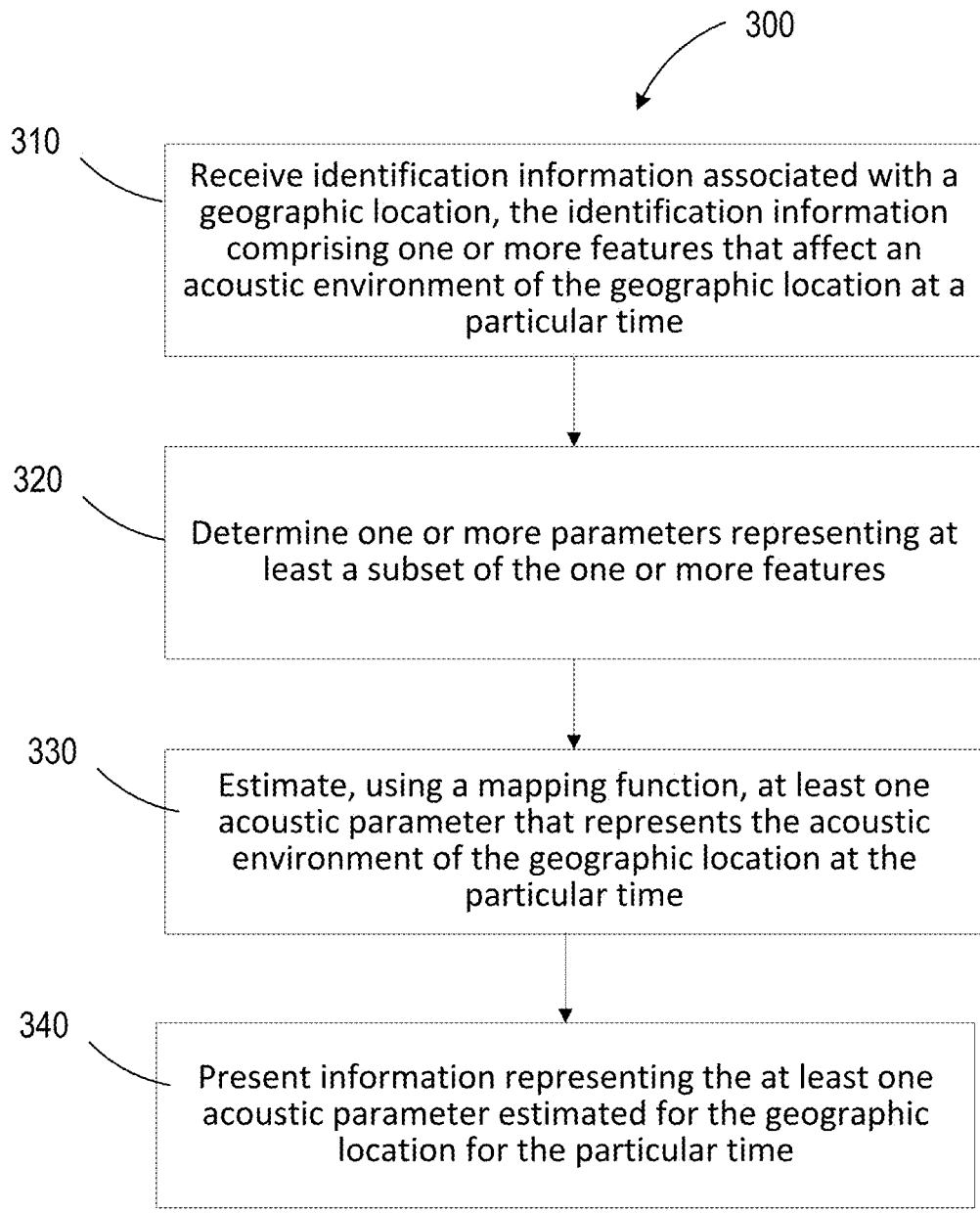
FIG. 3 is a flowchart of an example process for providing information on predicted ambient acoustic features.

FIG. 3 shows a flowchart of an example process 300 for providing information on predicted ambient acoustic features. The operations of the process 300 can be performed on one or more of the devices described above with respect to FIG. 1. For example, at least a portion of the process 300 can be performed by the prediction engine 125, which can be implemented on one or more servers 122. Portions of the process 300 can also be performed on a handheld device 102 or another computing device Operations of the process 300 includes receiving identification associated with a geographic location, wherein the identification information includes one or more features that affect an acoustic environment of the geographic location at a particular time (310). The one or more geographic locations can include, for example, a restaurant, a bar, or a retail establishment. The identification information can be substantially similar to the identification information 103 described above with reference to FIG. 1. The one or more features included in the identification information can include, for example, features described with reference to the time-specific information 107 and/or location-specific information 106 described above with reference to FIG. 1. For example, the one or more features included in the identification information can include, a time stamp, GPS information, or one or more features described with reference to the time-specific information 107 and/or location-specific information 106.

Operations of the process 300 also includes identifying one or more parameters that represent at least a subset of the one or more features (320). In some implementations, the one or more parameters can be derived, for example, by quantifying the one or more features of the subset. The relevant features can be selected, for example, based on input parameters for a machine learning process that generates a predicted acoustic feature for the geographic location.

Operations of the process 300 further includes estimating at least one acoustic parameter that represents the acoustic environment of the geographic location at the particular time (330). The at least one parameter can be estimated using a mapping function that generates the estimate of the at least one acoustic parameter as a weighted combination of the one or more parameters. The plurality of weights associated with the weighted combination can be determined using a machine learning process. Various machine learning processes (e.g., neural networks, deep neural networks, regression analyses, etc.) can be used in determining the plurality of weights.

The machine learning process can be trained, for example, accessing training information comprising at least one of: (i) time-specific information and (ii) location-specific information associated with ambient acoustic features at a plurality of geographic locations. The training information can include a measure of acoustic environment for each of the plurality of geographic locations. The training information can also include timestamp information, such as information on one or more of: a day of the week, a time of the day, or a time of the year. A set of input parameters each for at least a subset of the plurality of geographic locations can be identified from the training information, and the plurality of weights can be determined based on the set of input parameters. For example, the plurality of weights can be determined based on (i) the sets of input parameters and (ii) the corresponding measures of acoustic environments, such that each set of input parameters, when combined in a weighted combination using the plurality of weights, maps to the corresponding measure of acoustic environment. The measure of acoustic environment can include a sound pressure level (SPL) at the corresponding geographic location.

The training information can be gathered in a variety of ways. For example, the training information can include crowdsourced information on the ambient acoustic features at the plurality of geographic locations. The training information can be gathered, for example, using an application configured to be deployed on mobile devices. In some implementations, the training information can be retrieved from web-based content (e.g., using an application programming interface) that includes information on the ambient acoustic features at the plurality of geographic locations. The web-based content can include various social networking websites.

Operations of the process 300 can also include presenting, or causing a presentation of, information representing the at least one acoustic parameter estimated for the geographic location for the particular time (340). The information can be presented, for example, on a user-interface displayed on a computing device (e.g., a smartphone, tablet computer, or a desktop or laptop computer) of the user. The user interfaces can include any of the interfaces described with reference to FIGS. 2A-2I.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

In some implementations, an API (e.g., a RESTful API with JSON/XML output) and/or an embeddable plug-in, can be configured to interact with the prediction engine 125. The API or plug-in can be configured to forward queries about by venues to the prediction engine, and receive, for example, a javascript object of acoustics-related data (e.g., measurements, predictions, or tips). This can allow third-party websites and applications to be powered by the prediction engine 125.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A computer-implemented method comprising:
   receiving identification information associated with a queried geographic location, the identification information comprising one or more features that affect an acoustic environment of the queried geographic location at a particular time;
   determining one or more parameters representing at least a subset of the one or more features;
   estimating, by one or more processors, based on the one or more parameters, at least one acoustic parameter that represents the acoustic environment of the queried geographic location at the particular time,
   wherein the at least one acoustic parameter is estimated using a mapping function that generates the estimate of the at least one acoustic parameter as a weighted combination of the one or more parameters,
   wherein a plurality of weights associated with the weighted combination is determined using a machine-learning process based on training information that includes at least one of: (i) time-specific information and (ii) location-specific information associated with ambient acoustic features at a plurality of geographic locations including one or more geographic locations distinct from the queried geographic location, and a measure of acoustic environment for each of the plurality of geographic locations,
   wherein at least a portion of the training information is retrieved from web-based content associated with the plurality of geographic locations, and
   wherein training of the machine-learning process comprises:
   accessing the training information,
   identifying, from at least a portion of the training information, a set of input parameters each for at least a subset of the plurality of geographic locations, and
   determining the plurality of weights associated with the weighted combination based on (i) the sets of input parameters and (ii) corresponding measures of acoustic environments, such that each set of input parameters, when combined in the weighted combination in accordance with the mapping function, maps to the corresponding measure of acoustic environment; and
   presenting, using a user-interface displayed on a computing device, information representing the at least one acoustic parameter estimated for the queried geographic location for the particular time.

2. The method of claim 1, wherein the plurality of geographic locations comprises at least one of: a restaurant, a bar, or a retail establishment.

3. The method of claim 1, wherein the machine-learning process comprises a deep neural network process.

4. The method of claim 1, wherein the measure of acoustic environment for each of the plurality of geographic locations comprises a sound pressure level (SPL) at each of the plurality of geographic locations.

5. The method of claim 4, wherein information about the SPL is received from one or more mobile devices or hearing assistance devices.

6. The method of claim 1, wherein the training information comprises crowdsourced information on the ambient acoustic features at the plurality of geographic locations.

7. The method of claim 6, wherein the training information is gathered using an application configured to be deployed on mobile devices.

8. The method of claim 1, wherein the web-based content includes information on the ambient acoustic features at the plurality of geographic locations.

9. The method of claim 8, wherein the training information is retrieved using an application programming interface (API).

10. The method of claim 1, wherein the training information is retrieved from one or more social networking websites.

11. The method of claim 1, wherein the training information comprises information on one or more of: a day of the week, a time of the day, or a time of the year.

12. The method of claim 1, wherein the at least one acoustic parameter comprises a sound pressure level (SPL) or a power spectrum.

13. The method of claim 1, wherein the at least one acoustic parameter represents one of: a parameter of an auditory model related to speech intelligibility, or a speech transmission index (STI).

14. The method of claim 1, wherein the one or more parameters represent a percentage of a predetermined level of activity at the plurality of geographic locations for the particular time.

15. The method of claim 1, wherein one or more input parameters in the sets of input parameters represent information on location and/or physical characteristics of the plurality of geographic locations.

16. The method of claim 1, wherein the at least one acoustic parameter is overlaid on a map presented on the user-interface.

17. The method of claim 1, wherein the user-interface comprises one or more controls for displaying the queried geographic location if the at least one acoustic parameter is less than a threshold.

18. The method of claim 1, wherein the user-interface comprises controls for displaying an ordered list of the plurality of geographic locations, wherein the list is ordered based on corresponding ambient acoustic parameters.

19. The method of claim 1, wherein presenting the information representing the at least one acoustic parameter comprises displaying a time period for which the estimation is valid.

20. The method of claim 1, wherein the user-interface is provided by an application executing on a mobile device.

21. The method of claim 20, wherein the application comprises one or more controls for obtaining a measurement representing an ambient acoustic feature, and associating the measurement with a particular geographic location.

22. A system comprising:
    a prediction engine comprising one or more processing devices, the prediction engine configured to:

receive identification information associated with a queried geographic location, the identification information comprising one or more features that affect an acoustic environment of the queried geographic location at a particular time, determine one or more parameters representing at least a subset of the one or more features, estimate, based on the one or more parameters, at least one acoustic parameter that represents the acoustic environment of the queried geographic location at the particular time, wherein the at least one acoustic parameter is estimated using a mapping function that generates the estimate of the at least one acoustic parameter as a weighted combination of the one or more parameters, wherein a plurality of weights associated with the weighted combination is determined using a machine-learning process based on training information that includes at least one of: (i) time-specific information and (ii) location-specific information associated with ambient acoustic features at a plurality of geographic locations including one or more geographic locations distinct from the queried geographic location, and a measure of acoustic environment for each of the plurality of geographic locations, wherein at least a portion of the training information is retrieved from web-based content associated with the plurality of geographic locations, and wherein training of the machine-learning process comprises:

accessing the training information, identifying from at least a portion of the training information, a set of input parameters each for at least a subset of the plurality of geographic locations, and determining the plurality of weights associated with the weighted combination based on (i) the sets of input parameters and (ii) corresponding measures of acoustic environments, such that each set of input parameters, when combined in the weighted combination in accordance with the mapping function, maps to the corresponding measure of acoustic environment, and cause a presentation of information representing the at least one acoustic parameter estimated for the queried geographic location for the particular time, wherein the information representing the at least one acoustic parameter is presented on a user-interface displayed on a computing device; and a storage device configured to store a representation of the mapping function.

23. The system of claim 22, wherein the plurality of geographic locations comprises at least one of: a restaurant, a bar, or a retail establishment.

24. The system of claim 22, wherein the machine-learning process comprises a deep neural network process.

25. The system of claim 22, wherein the measure of acoustic environment for each of the plurality of geographic locations comprises a sound pressure level (SPL) at each of the plurality of geographic locations.

26. The system of claim 22, wherein the training information comprises crowdsourced information on the ambient acoustic features at the plurality of geographic locations.

27. The system of claim 22, wherein the training information is gathered using an application configured to be deployed on mobile devices.

28. The system of claim 22, wherein the web-based content includes information on the ambient acoustic features at the plurality of geographic locations.

29. The system of claim 28, wherein the training information is retrieved using an application programming interface (API).

30. The system of claim 22, wherein the at least one acoustic parameter comprises at least one of: a sound pressure level (SPL), a power spectrum, a parameter of an auditory model related to speech intelligibility, or a speech transmission index (STI).

31. The system of claim 22, wherein the at least one acoustic parameter is overlaid on a map presented on the user-interface.

32. The system of claim 22, wherein causing the presentation of the information to representing the at least one acoustic parameter comprises causing a display of a time period for which the estimation is valid.

33. The system of claim 22, wherein the user-interface is provided by an application executing on a mobile device.

34. One or more non-transitory machine-readable storage devices having encoded thereon computer readable instructions for causing one or more processors to perform operations comprising:

receiving identification information associated with a queried geographic location, the identification information comprising one or more features that affect an acoustic environment of the queried geographic location at a particular time;

determining one or more parameters representing at least a subset of the one or more features;

estimating based on the one or more parameters, at least one acoustic parameter that represents the acoustic environment of the queried geographic location at the particular time, wherein the at least one acoustic parameter is estimated using a mapping function that generates the estimate of the at least one acoustic parameter as a weighted combination of the one or more parameters, wherein a plurality of weights associated with the weighted combination is determined using a machine-learning process based on training information that includes at least one of: (i) time-specific information and (ii) location-specific information associated with ambient acoustic features at a plurality of geographic locations including one or more geographic locations distinct from the queried geographic location, and a measure of acoustic environment for each of the plurality of geographic locations, wherein at least a portion of the training information is retrieved from web-based content associated with the plurality of geographic locations, and wherein training of the machine learning process comprises:

accessing the training information, identifying, from at least a portion of the training information, a set of input parameters each for at least a subset of the plurality of geographic locations, and determining the plurality of weights associated with the weighted combination based on (i) the sets of input parameters and (ii) corresponding measures of acoustic environments, such that each set of input parameters, when combined in the weighted combination in accordance with the mapping function, maps to the corresponding measure of acoustic environment; and causing a presentation of information representing the at least one acoustic parameter estimated for the queried geographic location for the particular time, wherein the information representing the at least one acoustic parameter is presented on a user interface displayed on a computing device.

\* \* \* \* \*